United States Patent [19]
Roy et al.

[11] Patent Number: 5,923,411
[45] Date of Patent: Jul. 13, 1999

[54] PHOTOGRAPHIC PRINTER WITH MECHANISM FOR PLACING CONTACT PRINT SLIDE AT PAPER PRINT GATE

[75] Inventors: Carl W. Roy, Spencerport; John A. Schempp, Jr., Fairport, both of N.Y.

[73] Assignee: Eastman Kodak Company, Rochester, N.Y.

[21] Appl. No.: 08/884,393

[22] Filed: Jun. 27, 1997

[51] Int. Cl.⁶ .................................................. G03B 27/04
[52] U.S. Cl. ................................. 355/99; 355/78; 355/97
[58] Field of Search .................................. 355/78, 91, 93, 355/97, 99, 102, 122, 128

[56] References Cited

U.S. PATENT DOCUMENTS

| | | |
|---|---|---|
| 4,193,684 | 3/1980 | Armstrong . |
| 4,469,438 | 9/1984 | Itikawa . |
| 4,745,444 | 5/1988 | Miyawaki . |
| 4,766,492 | 8/1988 | Miyawaki . |
| 4,769,678 | 9/1988 | Komoda et al. . |
| 4,786,950 | 11/1988 | Haus ......................................... 355/99 |
| 4,857,964 | 8/1989 | Pohlman et al. . |
| 4,896,186 | 1/1990 | Tokuda . |
| 4,963,919 | 10/1990 | Matsumoto et al. . |
| 5,337,119 | 8/1994 | Tanibata . |
| 5,365,308 | 11/1994 | Ozawa et al. . |
| 5,390,001 | 2/1995 | Ishiwata et al. .......................... 355/85 |
| 5,430,523 | 7/1995 | Tanibata . |

FOREIGN PATENT DOCUMENTS

| | | |
|---|---|---|
| 62-176842 | 11/1987 | Japan . |
| 63-43138 | 3/1988 | Japan . |

*Primary Examiner*—Alan A. Mathews
*Attorney, Agent, or Firm*—Gordon M. Stewart

[57] ABSTRACT

Apparatus is disclosed for placing a contact print slide (134) in a photographic printer (10) having a platen (54) for supporting a photographic paper (32) during exposure of an image (88, 90) onto the paper at a paper print gate (36) at the platen. The apparatus may include a carrier (236, 238, 250) for holding a contact print slide; a first mechanism (100–182) for receiving a contact print slide and for moving a contact print slide into a first position for engagement with and removal by the carrier; a second mechanism (56–72, 192–206) for moving the carrier toward the first position to engage the carrier with a contact print slide received by the first mechanism and for moving the carrier away from the first position to remove a contact print slide from the first mechanism; and a third mechanism (208–248) for moving the carrier toward a photographic paper supported by the platen, in order to place a contact print slide engaged with the carrier into contact with a photographic paper supported by the platen at the print gate.

36 Claims, 10 Drawing Sheets

PHOTOGRAPHIC PRINTER WITH MECHANISM FOR PLACING CONTACT PRINT SLIDE AT PAPER PRINT GATE

FIELD OF THE INVENTION

The invention concerns apparatus for exposing images onto photographic paper. More particularly, a photographic printer is provided with a mechanism for placing a contact print slide at or removing the slide from a paper print gate of the printer. The slide may bear graphical or text information, or both, such as design or logo or message to be printed next to an image on the photographic paper.

BACKGROUND OF THE INVENTION

For many years, composite photographic prints have been available which combine a primary, conventional photographic image with a secondary, adjacent image including a text or logo, or both, appropriate to the primary image. For example, primary images of individuals or groups have been combined with secondary images of holiday greetings or other sentiments. Or, a primary image of an individual has been combined with a secondary image of business information in a format of a business calling card. Numerous such composite photographs have become known. See FIG. 3, which will be discussed subsequently in this specification.

Apparatus for producing composite photographs are of various types. For example, U.S. Pat. Nos. 4,769,678; 4,857,964; and 4,963,919 disclose apparatus in which negatives of a primary image and a secondary image are sequentially or simultaneously positioned at a negative film print gate and then exposed by projection onto photographic paper. U.S. Pat. Nos. 5,337,119 and 5,430,523 disclose another approach in which a primary image is exposed by projection onto photographic paper at a first paper print gate and a secondary image is exposed at a second paper print gate by a linear light valve array.

U.S. Pat. No. 4,193,684 discloses a photographic printing apparatus suitable for darkroom use, in which a contact print slide is illuminated at a paper print gate to provide a secondary image. U.S. Pat. No. 4,896,186 discloses a photographic printer in which a paper print gate is provided with a plurality of contact print heads along different edges of an exposure mask, with one of the print heads being illuminated depending on the orientation of a primary image. U.S. Pat. No. 5,365,308 discloses a paper mask unit for a photographic printer in which interchangeable slides each include a fixed aperture for masking a primary image, plus an adjacent text aperture for a secondary image.

FIG. 1 illustrates schematically a high speed photographic printer 10, such as a Model CLAS III made by Eastman Kodak Company. A film supply reel 12 supports a wound strip 14 made up of spliced, processed filmstrips. As images on strip 14 are sequentially projected onto photographic paper, a take-up reel 16 is rotated to take up the strip. Between reels 12, 16, a negative filmstrip print gate 18 flattens and supports each image on the strip before an illumination source 20. In the familiar manner, light from source 20 passes through each image, through an adjustable iris 22 and through a projection lens system 24 including a fixed lens element 26 and a movable lens element 28. Spaced from lens system 24, a paper supply roll 30 is rotated to provide a continuous strip 32 of photographic paper onto which images are to be exposed. As images are sequentially projected onto the photographic paper, a paper take-up roll 34 is rotated to take up the paper. Between rolls 30, 34, a paper print gate 36 flattens and supports the paper during exposure.

To determine proper exposure conditions for each image and, if appropriate, to detect images with different sizes or aspect ratios or to determine orientation of individual images, a conventional electronic image scanner 38 may be included. To read information magnetically recorded on a filmstrip, a magnetic read head 40 may be included. Also, to read information optically recorded on a filmstrip, an optical read head 42 may be included. A programmable controller 44 is connected to drive systems, not shown, for the strip 14 and paper 32; and to control circuits, not shown, for scanner 38 and read heads 40, 42. Thus, in the familiar manner, each image is scanned and any associated magnetic or optical codes are read as the image moves to filmstrip print gate 18. The illumination system, iris and lens system are then adjusted as appropriate to expose the image properly onto the photographic paper.

Such printers may include automatically adjustable edge masks for providing borders on prints or for making prints with different sizes or aspect ratios. For example, a pair of adjustable parallel edge masks 46, only one being shown, may be provided at paper print gate 36 along opposite edges of the paper, parallel to a longitudinal direction of movement of the paper through the paper print gate. Similarly, a pair of adjustable transverse edge masks 48, 50 also may be included, which extend normal to the direction of movement of the paper along opposite, transverse edges of the paper print gate. In the CLAS III printer, only masks 48, 50 are provided to set the longitudinal dimension of the opening of the paper print gate. The magnification of lens system 24 of a CLAS III printer is adjusted to cause the projected image to fill the length of the opening along the direction of movement of the paper, while portions of the projected image are allowed to spill over the unmasked parallel edges of the paper.

An edge mask apparatus 48 of the type used in the CLAS III printer is shown in FIG. 2. A similar mask assembly, not shown, also is provided on the opposite side of the paper print gate. A base plate 52 is located below a flat vacuum platen 54 which is supported on the base plate by suitable brackets, not shown. A driver is provided for the mask assembly. Particularly, a lead screw 56 is mounted for rotation parallel to platen 54 on suitable bearing blocks, not shown. Parallel to lead screw 56 are guide rails, such as slide rods 58, 60 mounted on suitable brackets 62, only one of which is shown. A bracket 64, supported by base plate 52, is included to mount a drive motor 66 which drives a timing belt 68 engaged with a pulley, not shown, engaged with lead screw 56. An edge mask support bracket 70 extends beneath platen 54 and is supported on slide rods 58, 60 by a pair of ball slides 72, only one of which is shown. Bracket 70 also is connected to a drive nut, not shown, on lead screw 56. Above platen 54, bracket 70 supports a transverse edge mask plate 74 which passes just above paper 32 to define a transverse edge of the paper print gate. A transverse paper guide 76 also is supported by bracket 70 to guide the paper over the platen. A light shield 78 is supported by a transverse angle bracket 80 mounted on bracket 70. In operation of the apparatus of FIG. 1, motor 66 is operated to rotate lead screw 56 which moves the drive nut and causes bracket 70 and mask plate 74 (and a mask assembly on the opposite side of the print gate) to move as necessary to set a desired length of the opening of the paper print gate.

FIG. 3 shows schematically a type of composite photograph 86 which can be made using the apparatus disclosed in the U.S. patents previously mentioned. A conventional, primary photographic image 88 and an associated secondary image 90 of text or graphics, or both, are exposed onto photographic paper sequentially or simultaneously. The secondary image may be positioned along any edge of the primary image. In high speed, wholesale printers such as the CLAS III, features for making such composite photographs would be desirable, provided the presence of such features would be compatible with normal high speed operation of such wholesale printers.

SUMMARY OF THE INVENTION

The invention concerns apparatus for placing a contact print slide in a photographic printer having a platen for supporting a photographic paper during exposure of an image onto the paper at a paper print gate at the platen. The invention also concerns the combination of such an apparatus with a photographic printer. The apparatus may include a carrier for holding a contact print slide. A first mechanism is included for receiving a contact print slide and moving a contact print slide into a first position for engagement with and removal by the carrier. A second mechanism is included for moving the carrier toward the first position to engage the carrier with a contact print slide received by the first mechanism and for moving the carrier away from the first position to remove a contact print slide from the first mechanism. And, a third mechanism is included for moving the carrier toward a photographic paper supported by the platen, thereby to place a contact print slide engaged with the carrier into contact with a photographic paper supported by the platen at the paper print gate.

The first mechanism may move a contact print slide to the first position along a path transverse to a direction of movement of a photographic paper along the platen; and the second mechanism may move the carrier parallel to the direction of movement. Means are included for illuminating a contact print slide engaged with the carrier. The carrier may include a pair of parallel grooves for receiving opposite edges of a contact print slide.

The first mechanism may include a slider; a support frame mounted on the slider for receiving a contact print slide; a rail supporting the slider for movement to the first position; and a driver to move the slider along the rail. A selectively actuateable clamp may be supported by the slider for holding a contact print slide on the support frame until engagement with the carrier. The support frame may include a pair of spaced members for engaging opposite sides of a contact print slide and a recessed base between the spaced members. The clamp may include a pivotable member mounted to the slider, the pivotable member having at least one clamping finger for pressing a contact print slide against the support frame, a spring biasing the clamping finger to contact a contact print slide; and an actuator mechanism for selectively pivoting the pivotable member against a bias of the spring to disengage the clamping finger from a contact print slide. The support frame and the rail may be on opposite sides of the platen; and the slider may include an opening for receiving an edge of the platen as the slider moves along the rail to the first position.

The second mechanism may include a frame supporting the carrier; at least one guide rail supporting the frame for movement to the first position; and a driver to move the frame along the guide rail. The third mechanism may include a frame; a support member pivotably mounted on the frame, the carrier being pivotably mounted on the support member; and an actuator for pivoting the support member to move the carrier toward the platen. Means, supported by the frame, may be provided for illuminating a contact print slide engaged with the carrier. The support member may include a yoke having spaced arms pivotably mounted on the frame; and the carrier may be pivotably mounted between the arms. The carrier may include a pair of parallel grooves for receiving opposite edges of a contact print slide.

A contact print slide according to the invention is particularly suited for use in a photographic printer. As such, the slide may include a frame having a central opening; a glass plate engaging the frame and extending across the central opening; a sheet attached to an outer surface of the glass plate, the sheet bearing a photographic negative of a message to be contact printed and extending beyond the frame; a trim filter sheet engaging the frame on an opposite side of the glass plate and extending across the central opening; and a transparent cover sheet engaging an outer surface of the trim filter sheet. The frame may have opposite ends having outwardly extended flanges for engaging a carrier for the contact print slide. The frame may include a radially inwardly extending support flange within the central opening between the glass plate and the trim filter sheet.

The invention provides various advantages. Contact print slides for composite photographs can be changed readily with minimal disturbance to the remainder of the photographic printer. When composite photographs are not desired, a contact print slide may remain installed and the contact print head assembly can function as a conventional edge mask simply by disabling its illuminator. The trim filter of the contact print slide can be easily changed to adjust the light transmission characteristics of the slide as appropriate for different messages. The slide can be installed in either of two orientations.

DETAILED DESCRIPTION OF THE INVENTION

Figure 1:
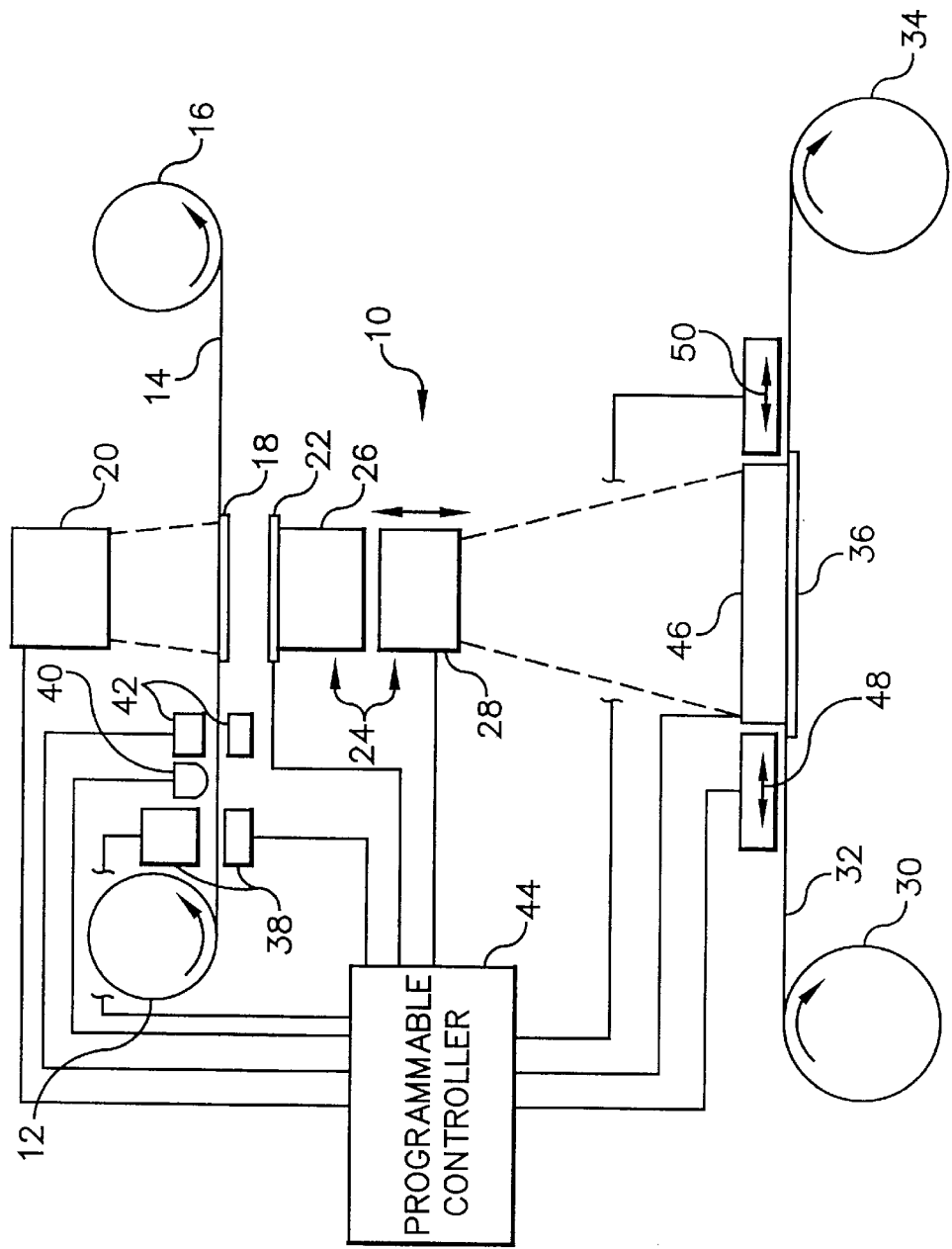
FIG. 1 shows schematically a prior art photographic printer of a type in which the present invention may be used.

The invention will be described with reference to the drawings, in which like reference numerals refer to like elements of structure in each of the several Figures.

Referring to FIGS. 4 to 7, those skilled in the art will understand the structure and function of the invention. Platen 54 has been cut away near the middle of paper print gate 36, for ease of illustration. A mounting plate 92 is secured to an upper surface of base plate 52 below paper print gate 36. A mounting slide block 94 is secured to mounting plate 92 and extends transversely beneath platen 54, there being appropriate passages through block 94 to accommodate slide rod 58 and lead screw 56. An inverted T-slot 96 is provided in block 94 to receive a correspondingly configured foot of a mounting flange 98 bolted to an elongated transverse frame member 100. When the foot of flange 98 is inserted into slot 96, frame member 100 is rigidly positioned beneath platen 54, transverse to the direction of movement of the paper through the print gate. On an upper surface of frame member 100 is mounted a slide rail 102 on which a slider 104 is mounted in the familiar manner.

A driver is provided for slider 104. Particularly, at a location spaced from base plate 52, frame member 100 supports a drive motor 106 having an output shaft supporting a driven pulley 108. A timing belt 110, shown in dashed lines, extends from pulley 108 and wraps partially onto a tension adjustment pulley 112, an idler pulley 114, a spring-mounted pulley 116, and an idler pulley 118. A bracket 120 is attached between timing belt 110 and slider 104. Thus, upon operation of motor 106, slider 104 can be moved back and forth along rail 102, transverse to the direction of movement of paper through print gate 36.

Figure 5:
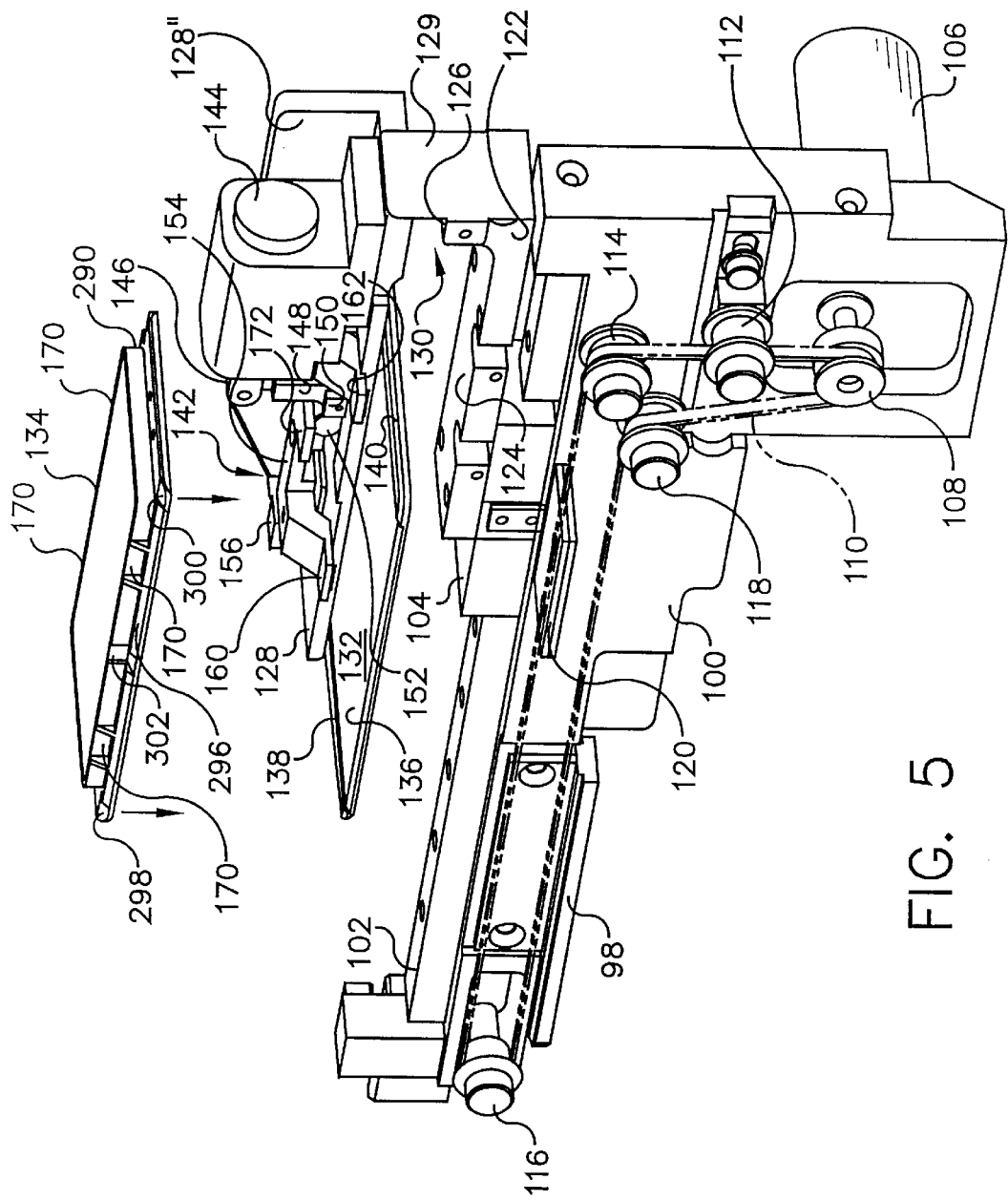
FIG. 5 shows an enlarged perspective, partially exploded view of a mechanism for positioning a contact print slide for pick up at a paper print gate, with the contact print slide positioned outside the print gate.

Attached to slider 104 is a mounting bracket 122 which includes a horizontal base 124 cantilevered from slider 104 above rail 102 and an essentially vertical post 126 extended upward from a free end of base 124. Attached to post 126 is an essentially horizontal support plate 128, which is cantilevered back over base 124. In the illustrated embodiment, base 124, post 126 and plate 128 form an integral bracket 122. A wiring cover 129 is attached to post 126. An opening or space 130 is defined between plate 128 and base 124 for receiving an edge of platen 54 when slider 104 is moved beneath the paper print gate to the position of FIGS. 8 and 9. Support plate 128, as shown, has a vertical edge flange 128', which comprises no part of the present invention and has been omitted from FIG. 7 for ease of illustration. As best seen in FIG. 5, a support frame or tray 132 is attached to an underside of support plate 128. Tray 132 extends essentially horizontally to receive a contact print slide 134. Details of contact print slide 134 will be discussed subsequently with regard to FIGS. 12 and 13. Tray 132 includes a flat rectangular center portion 134 which is recessed between a pair of raised support members, such as lands 138, 140 on which contact print slide 134 is supported. Since center portion 134 is recessed, the under side of contact print slide 134 is contacted only at its edges by lands 138, 140, thereby preventing scratching of the slide between the lands.

Figure 6:
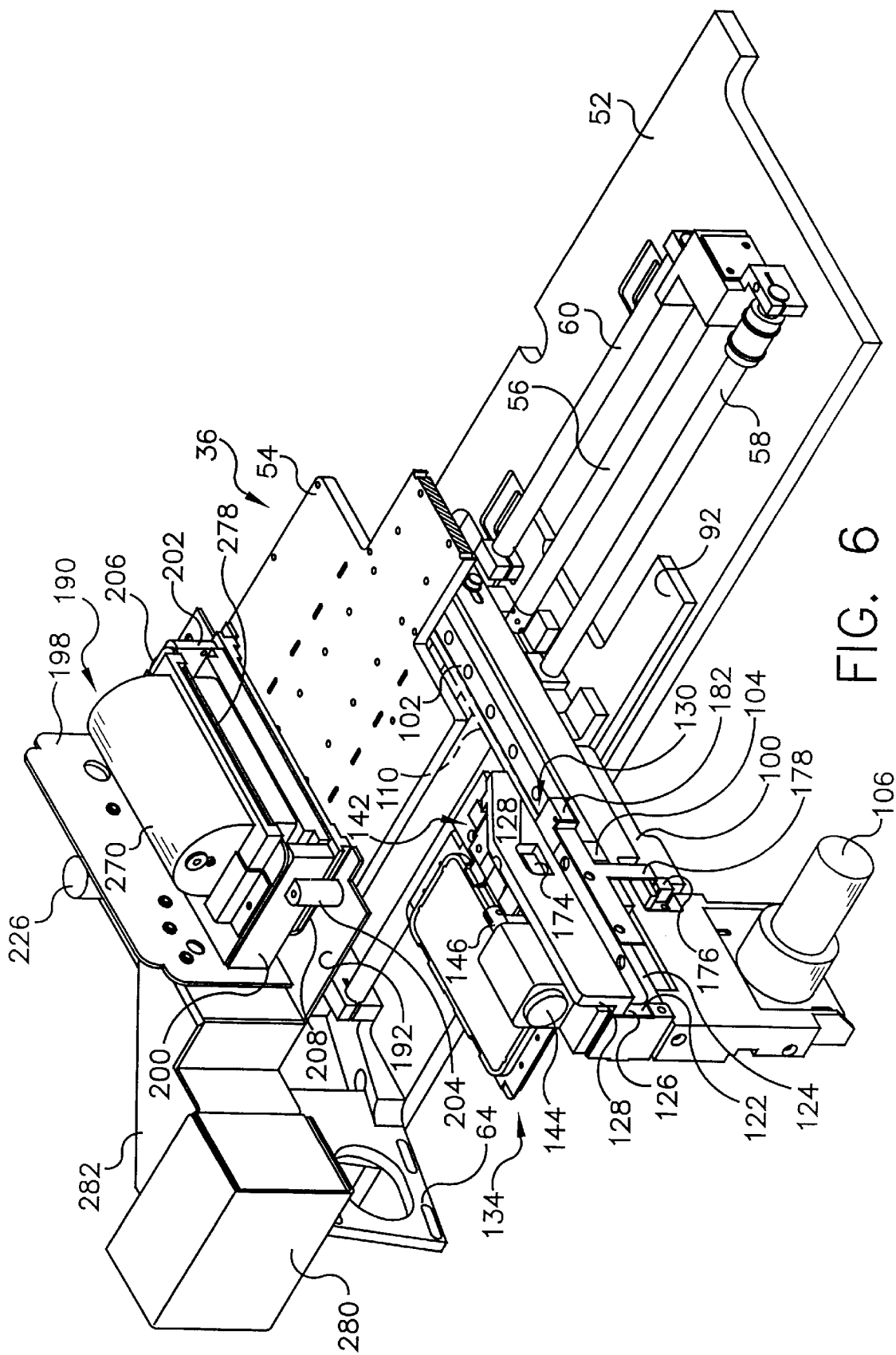
FIG. 6 shows a fragmentary perspective view of the apparatus of FIG. 4 from a right side.
Figure 7:
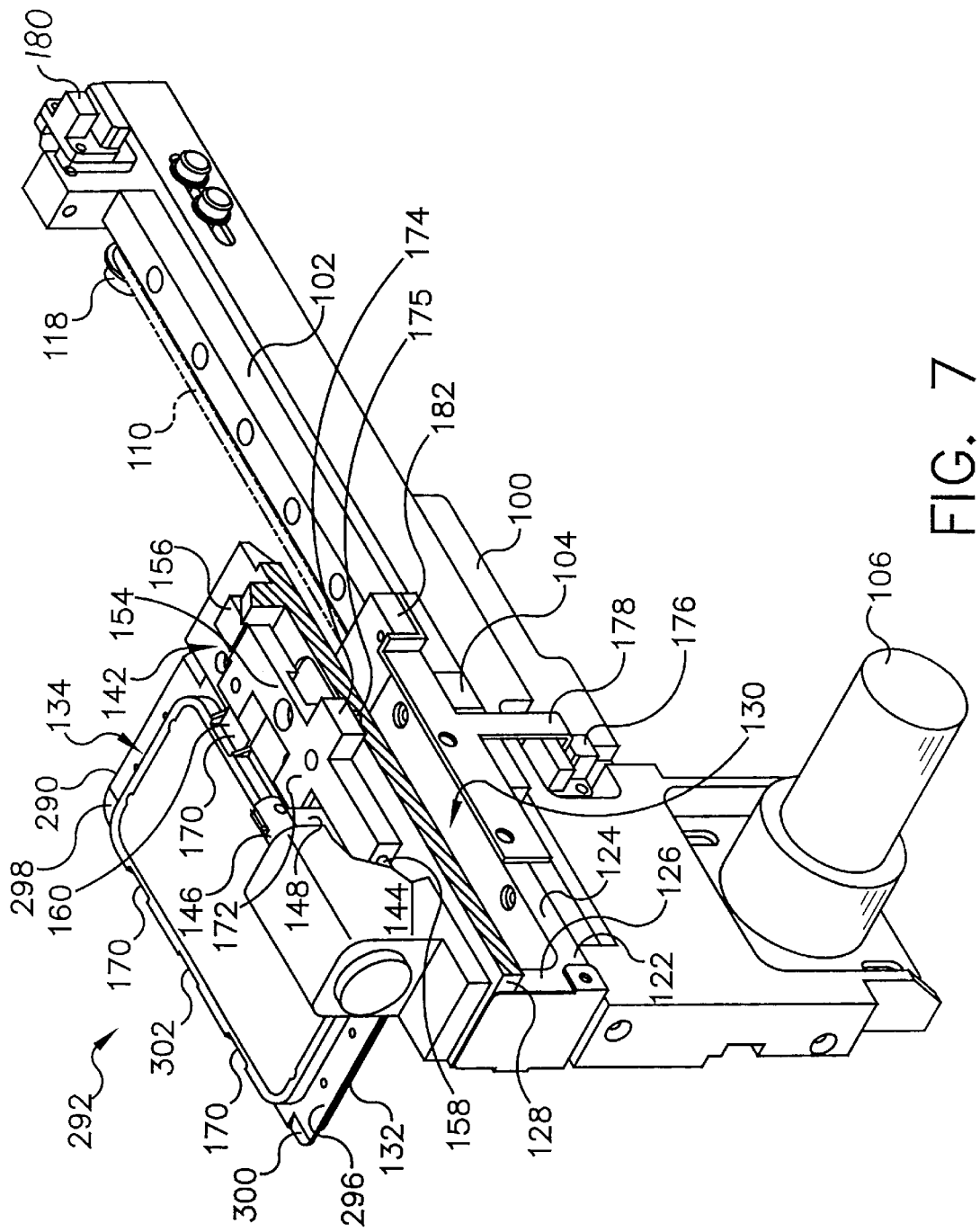
FIG. 7 shows an enlarged perspective view of the mechanism of FIG. 5 from a right side.
Figure 8:
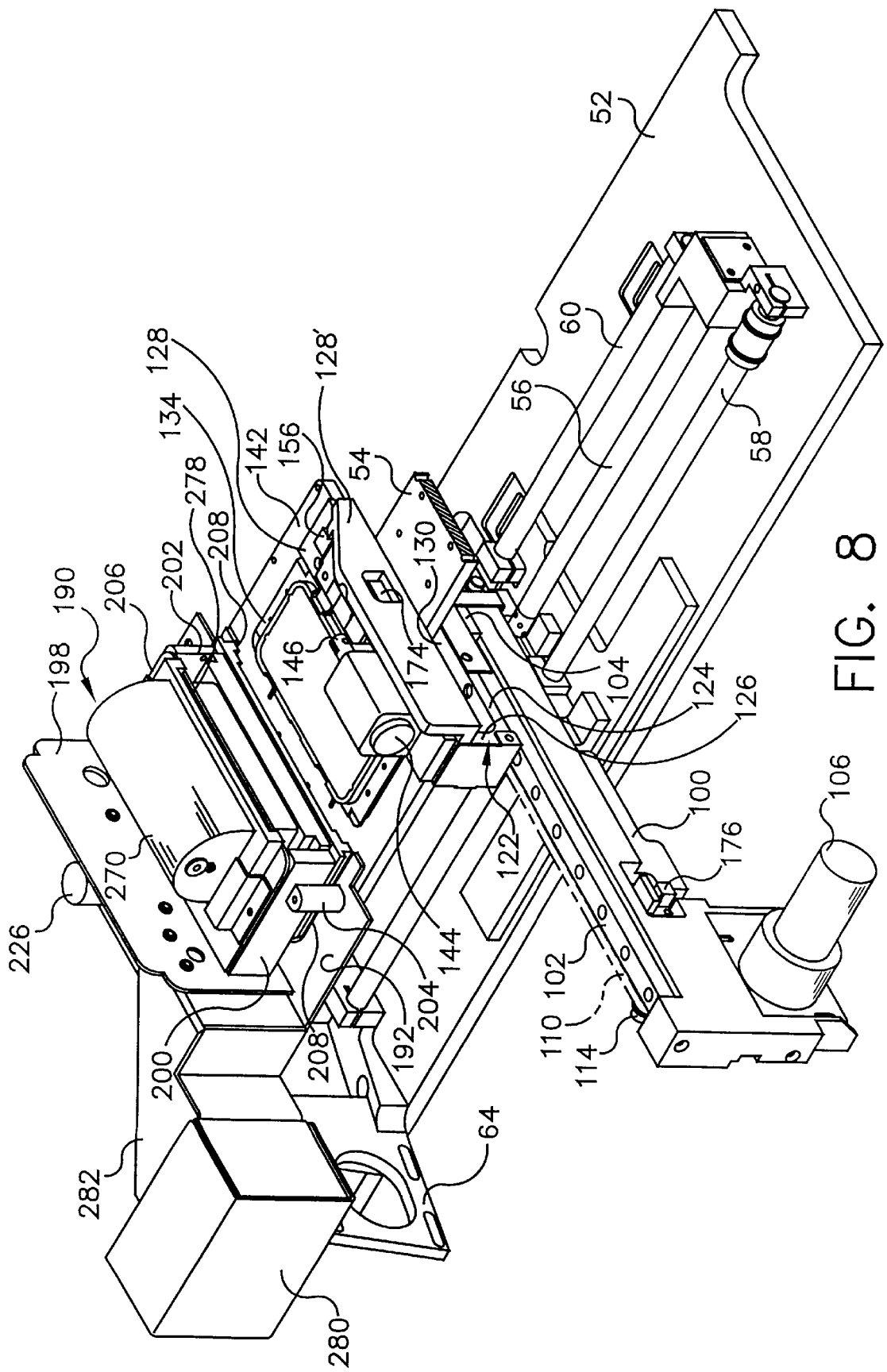
FIG. 8 shows the apparatus of FIG. 6, with the contact print slide positioned for removal inside the print gate above the platen.

On an upper surface of support plate 128 is mounted a clamping mechanism 142 for holding a contact print slide on tray 132. A solenoid actuator 144 includes an output shaft 146 which is pivotably connected to an end of a J-shaped link 148, as best seen in FIG. 5. Link 148 is mounted on a pivot 150 extended upwardly from support plate 128. A contact tip 152 of link 148 extends upward approximately midway between lands 138, 140. As shown in FIGS. 5 and 7, an elongated clamp member or body 154 is rotatably mounted between a bearing block 156 extended upwardly from support plate 128 and a bearing 158 provided in the body of actuator 144. A pair of clamping fingers 160, 162 extend transversely from clamp body 154 in positions to engage a pair of notches 170 formed in a frame of contact print slide 134. The clamping fingers have depending end flanges, not shown, which enter slots in notches 170 to provide proper mechanical engagement. An actuation finger 172 extends transversely from clamp body 154 between clamping fingers 160, 162, in position to engage contact tip 152. Opposite actuation finger 172, a spring retainer flange 174 extends transversely from clamp body 154 and engages a compression spring 175, shown fragmentarily in FIG. 7, which is captured between flange 174 and support plate 128. The force of spring 175 thus acts on flange 174 and causes clamp body 154 to rotate and move clamping fingers 160, 162 downward to clamp a contact print slide against tray 132. An outer end of retainer flange 174 extends into an opening through edge flange 128', as shown in FIGS. 6, 8 and 9.

When a contact print slide is to be placed on tray 132, actuator 144 is operated to retract output shaft 146. This causes link 148 to rotate about pivot 150, which presses contact tip 152 against an under surface of actuation finger 172 and causes clamp body 154 to rotate and lift clamping fingers 160, 162 upward. A contact print slide 134 is then manually placed on tray 132 with the slide supported on lands 138, 140. Actuator 144 is then operated to allow output shaft 146 to extend, thereby rotating link 148 to allow actuation finger 172 to move downward under the influence of spring 175. Clamping fingers 160, 162 thus are engaged with notches 170 to center the contact print slide on tray 132, as shown in FIG. 7. An optical sensor, not shown, may be mounted on support plate 128 to detect the presence of a contact print slide on the tray. In the position of FIG. 7, a sensor 176 mounted on frame member 100 coacts with a flag member 178 mounted on slider 104, to signal a controller for the apparatus, not shown, that tray 132 is in the withdrawn position of FIG. 7. Subsequently, when tray 132 is moved to the position of FIG. 8, a sensor 180 mounted on an opposite end of frame 100 coacts with a flag member 182 mounted on slider 104, to signal the controller that tray 132 is in the inserted position.

Figure 2:
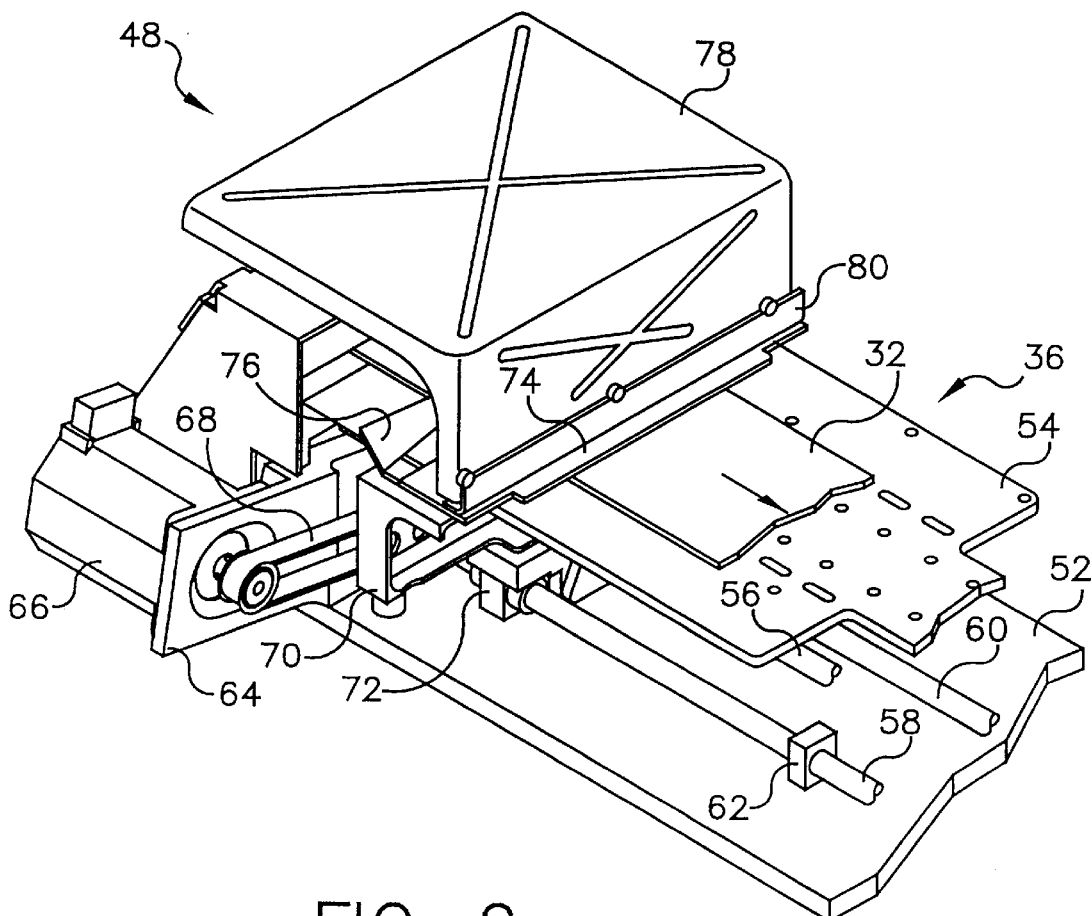
FIG. 2 shows a fragmentary perspective view of one side of a paper print gate in a prior art photographic printer, with details of a longitudinally adjustable edge mask assembly.
Figure 9:
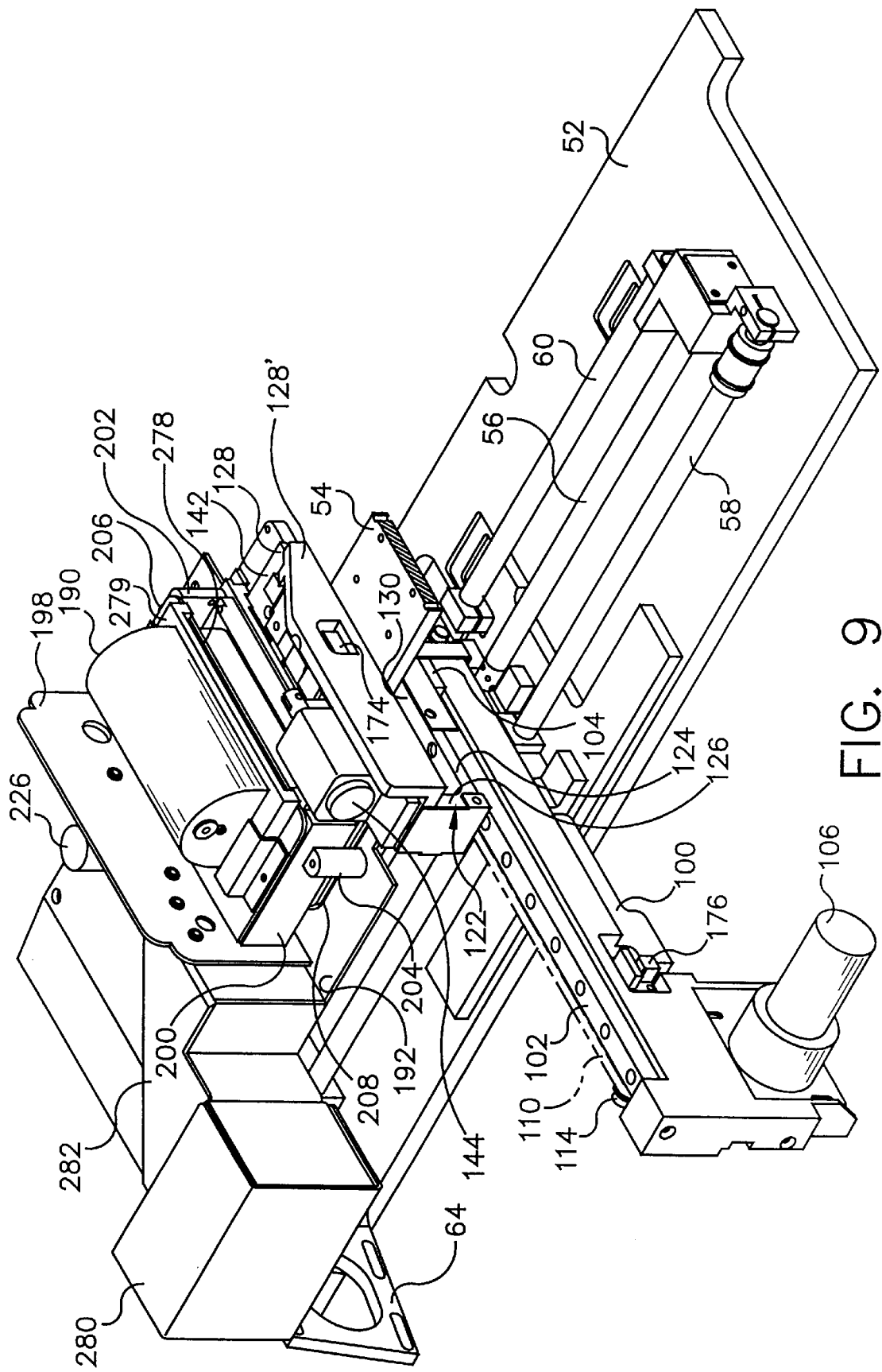
FIG. 9 shows the apparatus of FIG. 8, with the slide carrier advanced to engage and remove a contact print slide from the mechanism of FIGS. 5 and 7.
Figure 10:
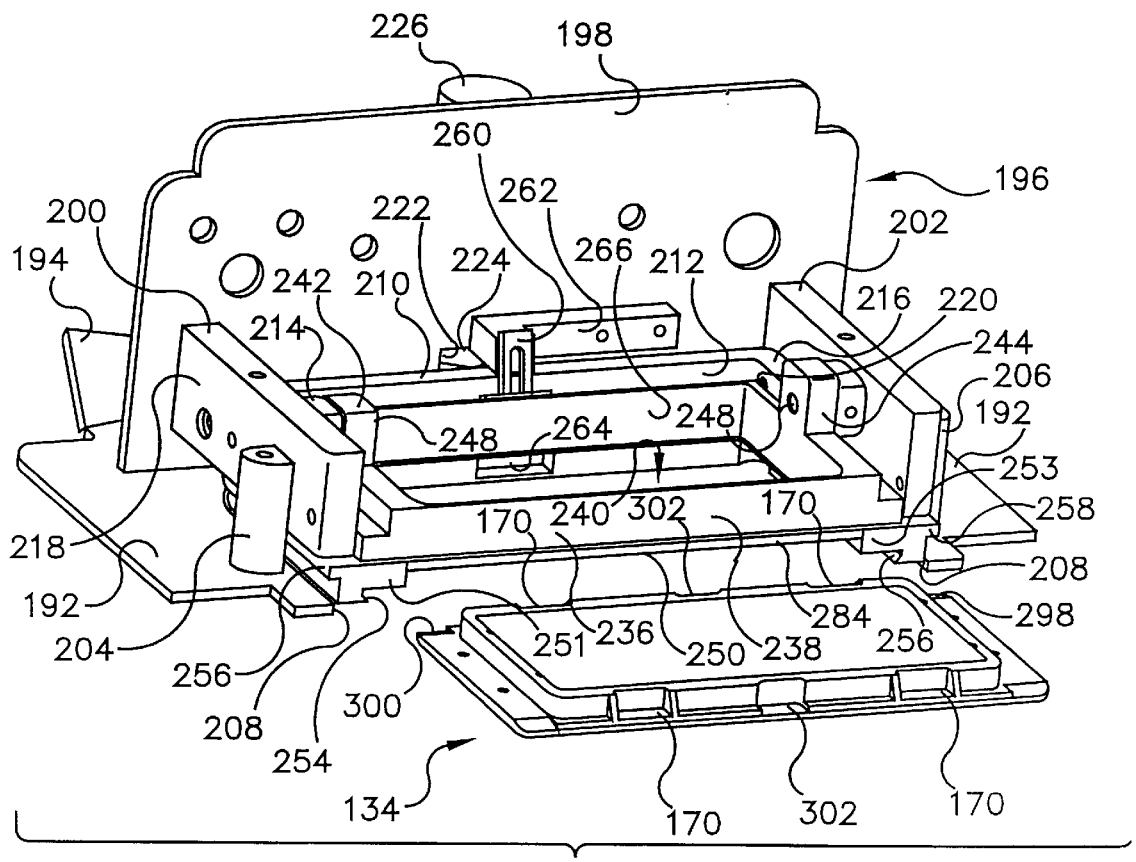
FIG. 10 shows a fragmentary, perspective, partially exploded view of the slide carrier which engages and removes a contact print slide.
Figure 11:
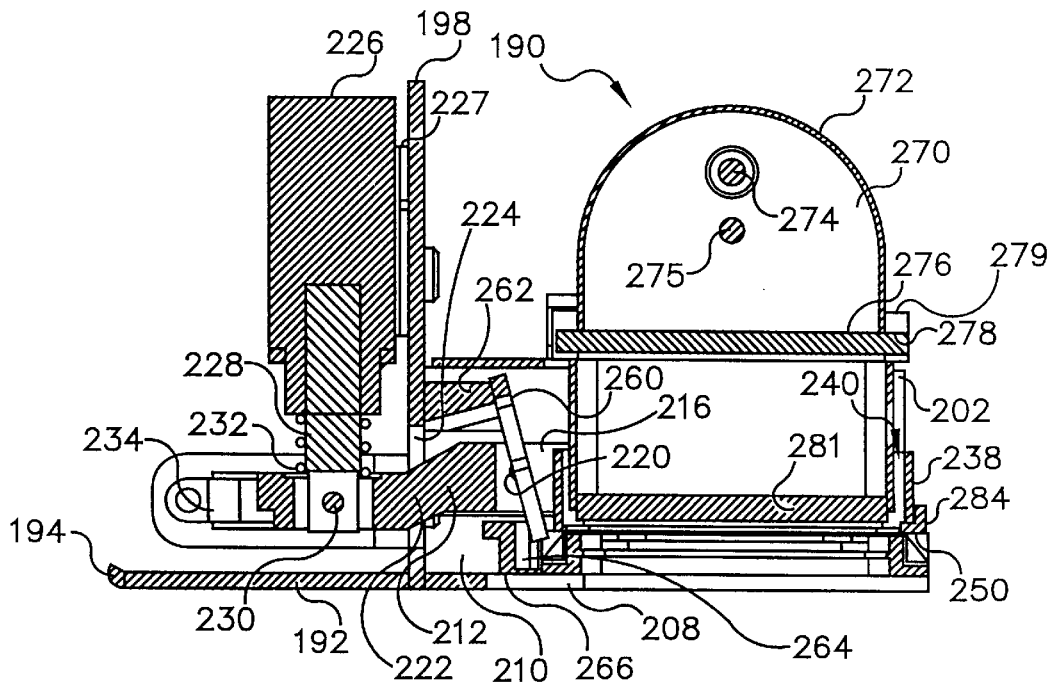
FIG. 11 shows a sectional view of the contact print head assembly, taken along line 11—11 of FIG. 4.

As shown in FIGS. 4, 6, 8 and 9, edge mask assembly 48 of FIG. 2 has been replaced with a contact print head assembly 190. As shown in FIGS. 9 to 11, contact print head assembly 190 includes a base plate 192 having a flared inlet guide flange 194, which essentially replaces transverse paper guide 76 of FIG. 2. Though not shown in FIGS. 4, 6, 8 and 9, a support bracket like bracket 70 of FIG. 2 is included, so that contact print head assembly 190 can be moved back and forth in the same manner as previously shown and described for edge mask assembly 48. A mechanism support frame 196 includes an essentially vertical back plate 198 from which extends a pair of parallel support arms 200, 202. Attachment bosses 204, 206 on the support arms are used to mount frame 196 to base plate 192. A U-shaped opening 208 is provided through base plate 192 and edges of opening 208 are visible in FIGS. 9 and 10. Opening 208 opens toward tray 132 and contact print slide 134 in the position of FIG. 8.

Figure 4:
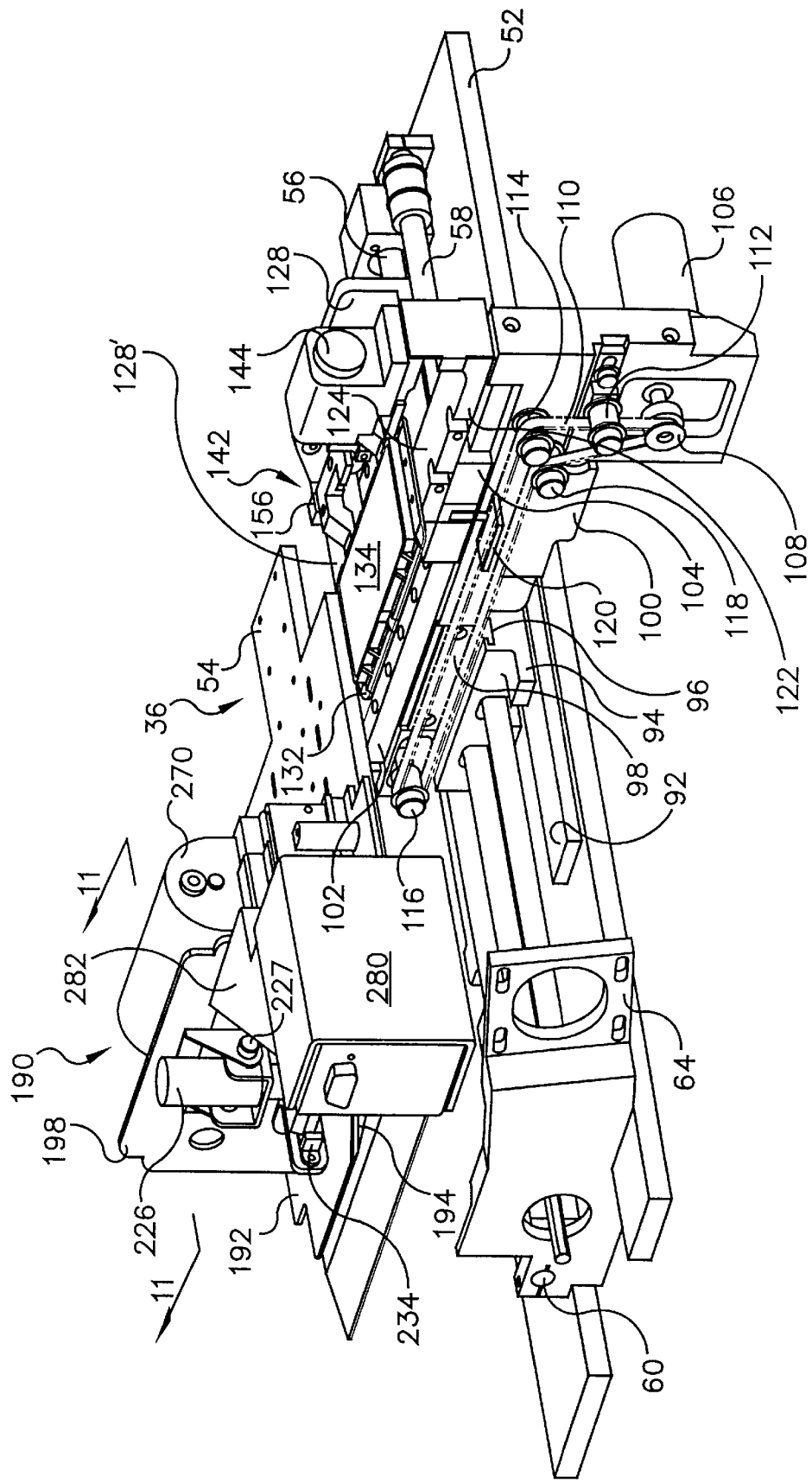
FIG. 4 shows a fragmentary perspective view from a left side of a paper print gate including an apparatus for placing contact print slide in accordance with the invention.

As shown in FIGS. 10 and 11, between support arms 200, 202 is mounted a yoke 210 which includes a base member 212 from which extends a pair of parallel arms 214, 216. Only the outer end of arm 214 is visible in FIG. 10. A pair of pivots 218, 220 pivotably mount yoke 210 between support arms 200, 202, respectively. Centrally positioned on base 212 is an actuation lever 222 which extends away from pivots 218, 220 through an opening 224 through back plate 198. As best seen in FIGS. 4 and 11, a solenoid actuator 226 is supported on a pivot mount 227 attached to the other side of back plate 198 from support arms 200, 202. An output shaft 228 extends from the actuator and a pivot 230 connects shaft 228 to actuation lever 222. A compression spring 232 surrounds shaft 228 between the actuator and the actuation lever. When shaft 228 is in its extended position, spring 232 biases actuation lever 222 downward, thereby pivoting yoke 210 upward about pivots 218, 220. A sensor 234 monitors the position of actuation lever 222 and signals the controller accordingly.

Between arms 214, 216, a carrier assembly 236 is mounted for holding contact print slide 134. Carrier assembly 236 includes an essentially rectangular support frame 238 having a central opening 240. A pair of bosses 242, 244 extend upwardly from support frame 238. A pair of pivots 248, only one of which is visible in FIG. 10, are provided between bosses 242, 244 and the outer ends of arms 214, 216. Thus, carrier 236 is pivotably suspended within yoke 210. Integrally formed with support frame 238 is a slide carrier frame 250 which also surrounds central opening 240. Frame 250 includes parallel depending wall members 251, 253 in which are formed parallel grooves 254, 256 for slidably receiving opposite base flanges 296 of the contact print slide. See also the subsequent discussion of FIGS. 12 and 13. Frame 250 includes a pair of parallel stop flanges 256, 258 which extend horizontally past the edges of opening 208 to limit downward movement of frames 238, 250. A detector 260 is supported on a bracket 262 attached to back plate 198. Detector 260 extends into a pocket 264 formed in a back wall 266 of carrier frame 250. Detector 260 senses the presence of a contact print slide by reflectance from a central notch 302 in the frame of the slide. Upon operation of actuator 226, shaft 228 is retracted upward against the force of spring 232, as viewed in FIG. 11, thereby pivoting yoke 210 clockwise and lowering frame 250 through opening 208 toward a strip of photographic paper positioned on platen 34. Eventually, an under side of slide 134 contacts the paper. The slide is then illuminated, after which the actuator 226 is operated to raise the slide away from the paper to allow the paper to be advanced for the next exposure. If a secondary image is not to be printed, the slide is lowered into contact with the paper but is not illuminated when the primary image is projected to the paper. In the latter case, the edge of frame 250 will serve as a conventional edge mask.

A lamp house 270 is supported on arms 200, 202 above opening 240, to provide light for exposing onto the paper the images carried by the contact print slide. A semicylindrical reflector 272 encloses a conventional xenon flash lamp 274. A reflective light dispersing rod 275 is positioned below the lamp. The inside surfaces of frame 238 may be reflective if necessary in view of the characteristics of lamp 274. A trim filter 276 may be provided below lamp 274 for color correction of the light from lamp 274 in the conventional manner. To facilitate changing filter 276, a slot 278 is provided in a base frame 279 of the lamp housing. A semi-transparent plastic diffuser 281 is mounted below filter 276. For an elongated xenon flash lamp, diffuser 281 should be thicker below the brightest part of the lamp and should taper toward the ends of the lamp, to provide a more uniform light source above the contact print slide. To prevent leakage of light between the lamp housing and the contact print slide, a strip 284 of compliant plush material is attached to frame 238 between depending wall members 251, 253 to engage frame 290. As shown in FIGS. 4 to 6 and 8, a power supply module 280 for the lamp is supported by a bracket 282 attached to back plate 198.

Figure 12:
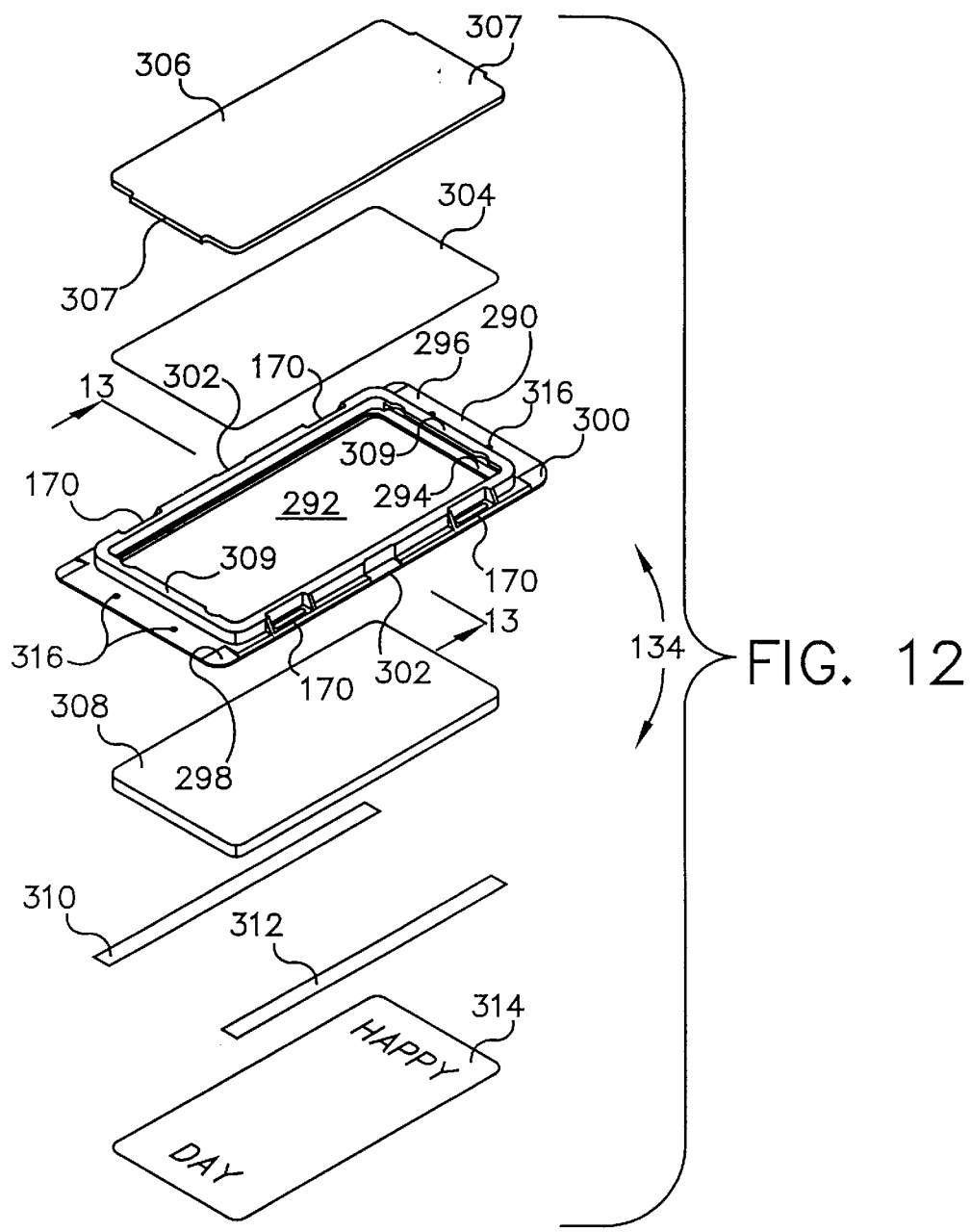
FIG. 12 shows an exploded, perspective view of a contact print slide according to the invention.
Figure 13:
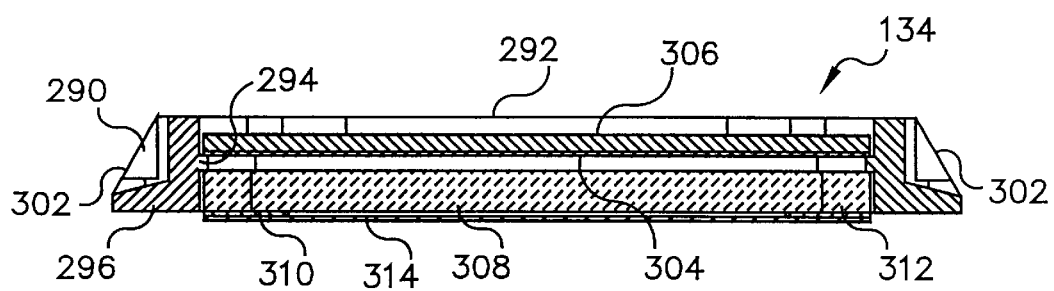
FIG. 13 shows a sectional view of the contact print slide, taken along line 13—13 of FIG. 12.

FIGS. 12 and 13 show details of contact print slide 134. A rectangular frame 290 has bilateral symmetry to allow the slide to be inserted in either of two orientations. Within a rectangular central opening 292 of frame 290 is provided a radially inwardly extended central support flange 294. Surrounding frame 290 is a radially outwardly extended base flange 296. To ease insertion of end portions of flange 296 into slots 254, 256, lead-in tapers 298, 300 are provided at the corners of the flange. Between notches 170, a central notch 302 is provided for cooperation with detector 220, as previously described.

Figure 3:
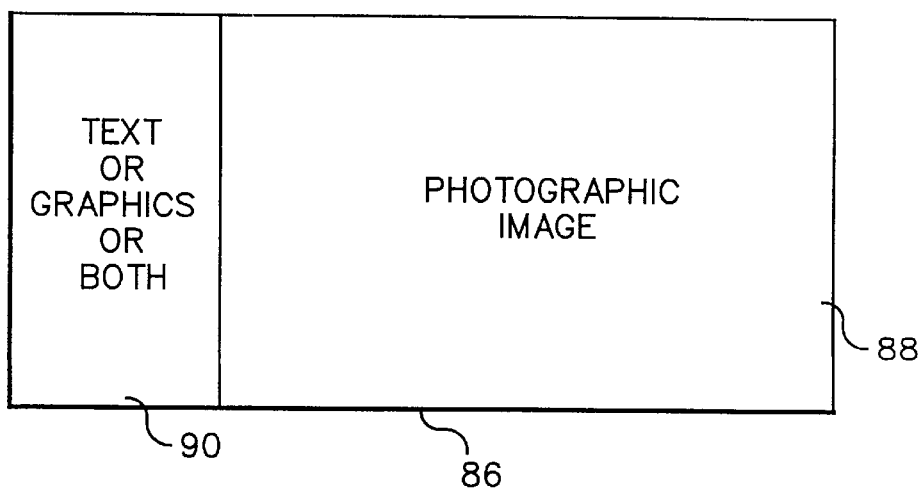
FIG. 3 shows schematically a prior art composite photograph.

Within frame 290, a trim filter sheet 304 of conventional color correction filter stock rests on an upper surface of support flange 294 and can be readily removed. Outboard of trim filter sheet 304 is a transparent cover 306 having end tabs 307 which snap beneath retainer flanges 309 on frame 290 to hold the trim filter sheet in place. Thus, cover 306 can be easily removed to permit changing of the trim filter. Below support flange 294 is positioned a sheet 308 of optically clear glass which may be held in place by a suitable adhesive. A pair of double-sided tape strips 310, 312 are stuck near opposite edges of plate 308 to secure a photographic negative 314 bearing text or graphics, or both, to be contact printed onto the paper. As shown in FIG. 3, negative 314 extends slightly below an under surface of frame 290, to ensure that only carrier sheet 314 will contact the paper. For example, the thickness of negative 314 may lie entirely below the under surface of the frame. Because the contact print slide is supported on lands 138, 140 on tray 132, the carrier sheet will not be scratched during transfer from the tray to slide carrier 250. Those skilled in the art will appreciate that support flange 294 need not be included and that sheet 308 may contact filter sheet 304 without departing from the invention.

In use of the apparatus, motor 106 is operated to move tray 132 to the position of FIGS. 4 to 7. Actuator 144 is operated to raise clamping fingers 160, 162. The previously used contact print slide, if present, is removed. A fresh contact print slide 134 with a desired text or design is then placed on tray 132 and actuator 144 is operated to allow the clamping mechanism 142 to close. Motor 106 is operated to move tray 132 to the position of FIG. 8 opposite carrier assembly 236. Motor 66 then is operated to cause contact print head assembly 190 to move to the position of FIG. 9; so that, the ends of base flange 296 slip into grooves 252, 254 of slide carrier 250. Actuator 144 is operated to open clamping mechanism 142. To hold the contact print slide in place, spring loaded ball plungers, not shown, may be provided adjacent grooves 254, 256, to engage small depressions 316 in the upper end surfaces of base flange 296. Motor 66 then is operated to cause the contact print head assembly to move away from tray 132, thereby leaving the contact print slide held within slide carrier 250. Finally, motor 106 is operated to move tray 132 back to the position of FIGS. 4 to 7. Exposure of composite images then proceeds as previously described. If images are interspersed in the negative film strip for which no secondary image is desired, the controller can account for this by adjusting the feed of the paper and not illuminating the contact print slide when no secondary image is desired. To remove the contact print slide, the process is reversed.

The invention has been described in detail with particular reference to certain preferred embodiments thereof, but it will be understood that variations and modifications can be effected within the spirit and scope of the invention.

PARTS LIST

| | |
|---|---|
| 10 . . . photographic printer | 74 . . . transverse edge mask plate |
| 12 . . . film supply reel | 76 . . . transverse paper guide |
| 14 . . . spliced negative film strips | 78 . . . light shield |
| 16 . . . film take-up reel | 80 . . . angle bracket |
| 18 . . . negative film strip print gate | 86 . . . composite photograph |
| 20 . . . source of illumination | 88 . . . conventional photographic image |
| 22 . . . adjustable iris | |
| 24 . . . projection lens system | 90 . . . image of text or graphics or both |
| 26 . . . fixed lens element | 92 . . . mounting plate |
| 28 . . . movable lens element | 94 . . . slide block |
| 30 . . . photographic paper supply roll | 96 . . . inverted T-slot in 94 |
| 32 . . . strip of photographic paper | 98 . . . mounting flange |
| 34 . . . paper take-up roll | 100 . . . elongated transverse frame member |
| 36 . . . paper print gate | |
| 38 . . . electronic scanner | 102 . . . slide rail on 100 |
| 40 . . . magnetic read/write head | 104 . . . slider |
| 42 . . . optical read head | 106 . . . drive motor |
| 44 . . . programmable controller | 108 . . . driven pulley |
| 46 . . . parallel edge mask | 110 . . . timing belt |
| 48, 50 . . . transverse edge masks | 112 . . . idler pulley, adjustable |
| 52 . . . base plate | 114 . . . idler pulley |
| 54 . . . flat vacuum platen | 116 . . . idler pulley, adjustable |
| 56 . . . lead screw | 118 . . . idler pulley |
| 58, 60 . . . slide rods | 120 . . . bracket between 104 & 110 |
| 62 . . . bracket for 58 | 122 . . . mounting bracket |
| 64 . . . bracket | 124 . . . horizontal base of 122 |
| 66 . . . motor | 126 . . . vertical post of 122 |
| 68 . . . timing belt to 56 | 128 . . . horizontal support plate |
| 70 . . . edge mask support bracket | 128' . . . flange |
| 72 . . . ball slide on 58 | 129 . . . wiring cover |
| 130 . . . space between 124, 128 | 208 . . . U-shaped opening in 192 |
| 132 . . . support frame or tray | 210 . . . yoke |
| 134 . . . contact print slide | 212 . . . base |
| 136 . . . flat rectangular central portion | 214, 216 . . . parallel arms |
| 138, 140 . . . raised support members or lands | 218, 220 . . . pivots |
| | 222 . . . actuation lever |
| 142 . . . clamping mechanism | 224 . . . opening through 198 |
| 144 . . . solenoid actuator | 226 . . . solenoid actuator |
| 146 . . . output shaft of 144 | 227 . . . pivot mount of 226 to 198 |
| 148 . . . J-shaped link | 228 . . . output shaft of 226 |
| 150 . . . pivot for 148 | 230 . . . pivot 228 to 222 |
| 152 . . . contact tip of 148 | 232 . . . spring |
| 154 . . . clamp member or body | 234 . . . sensor |
| 156 . . . bearing block | 236 . . . carrier assembly |
| 158 . . . bearing in body of 144 | 238 . . . essentially rectangular support frame |
| 160, 162 . . . clamping fingers | 240 . . . central opening in 238 |
| 170 . . . notches in frame of 134 | 242, 244 . . . central bosses on 238 |
| 172 . . . actuation finger on 154 | 248 . . . pivot mounts |
| 174 . . . spring retainer on 154 | 250 . . . slide carrier for 134 |
| 175 . . . spring | 251, 253 . . . depending wall members |
| 176 . . . sensor | |
| 178 . . . flag | 252, 254 . . . parallel grooves in 250 to receive 134 |
| 180 . . . sensor | |
| 182 . . . flag | 256, 258 . . . stop flanges on 250 |
| 190 . . . contact print head assembly | 260 . . . detector |
| 192 . . . base plate | 262 . . . bracket for 260 |
| 194 . . . flared inlet guide flange | 264 . . . pocket in 266 |
| 196 . . . mechanism support frame | 266 . . . back wall of 250 |
| 198 . . . back plate | 270 . . . lamp house to illuminate 134 |
| 200, 202 . . . parallel support arms | 272 . . . semicylindrical reflector |
| 204, 206 . . . attachment bosses | 274 . . . lamp |
| 275 . . . light dispersing rod | |
| 276 . . . trim filter | |
| 278 . . . slot | |
| 279 . . . base frame of 270 | |
| 280 . . . power supply module for 270 | |
| 281 . . . diffuser | |

-continued

PARTS LIST

282 . . . bracket
284 . . . strip of compliant plush
290 . . . frame of 134
292 . . . rectangular central opening of frame 290
294 . . . radially inwardly extended support flange
296 . . . radially outwardly extended base flange
298, 300 . . . lead-in tapers on 296
302 . . . central notches
304 . . . trim filter sheet
306 . . . cover
307 . . . end tabs on 306
308 . . . glass sheet
309 . . . retainer flange
310, 312 . . . tape strips
314 . . . photographic negative of text or logo
316 . . . depression in 296

What is claimed is:

1. Apparatus for placing a contact print slide in a photographic printer having a platen for supporting a photographic paper during exposure of an image onto the paper at a paper print gate at the platen, said apparatus comprising:

a carrier for holding a contact print slide;

a first mechanism for receiving a contact print slide and for moving a contact print slide into a first position for engagement with and removal by said carrier;

a second mechanism for moving said carrier toward said first position to engage said carrier with a contact print slide received by said first mechanism and for moving said carrier away from said first position to remove a contact print slide from said first mechanism; and a third mechanism for moving said carrier toward a photographic paper supported by the platen, thereby to place a contact print slide engaged with said carrier into contact with a photographic paper supported by the platen at the paper print gate.

2. Apparatus according to claim 1, wherein said first mechanism moves a contact print slide to said first position along a path transverse to a direction of movement of a photographic paper along the platen; and said second mechanism moves said carrier parallel to said direction of movement.

3. Apparatus according to claim 1, further comprising means for illuminating a contact print slide engaged with said carrier.

4. Apparatus according to claim 1, wherein said carrier comprises a pair of parallel grooves for receiving opposite edges of a contact print slide.

5. Apparatus according to claim 1, wherein said first mechanism comprises:

a slider;

a support frame mounted on said slider for receiving a contact print slide;

a rail supporting said slider for movement to said first position; and a driver to move said slider along said rail.

6. Apparatus according to claim 5, further comprising a selectively actuateable clamp supported by said slider for holding a contact print slide on said support frame until engagement with said carrier.

7. Apparatus according to claim 6, wherein said support frame comprises a pair of spaced members for engaging opposite sides of a contact print slide and a recessed base between said spaced members; and said clamp comprises a pivotable member mounted to said slider, said pivotable member having at least one clamping finger for pressing a contact print slide against said support frame, a spring biasing said clamping finger to contact a contact print slide; and an actuator mechanism for selectively pivoting said pivotable member against a bias of said spring to disengage said clamping finger from a contact print slide.

8. Apparatus according to claim 5, wherein said support frame and said rail are on opposite sides of the platen; and said slider includes an opening for receiving an edge of the platen as said slider moves along said rail to said first position.

9. Apparatus according to claim 1, wherein said second mechanism comprises:
   a frame supporting said carrier; and
   at least one guide rail supporting said frame for movement to said first position; and
   a driver to move said frame along said guide rail.

10. Apparatus according to claim 1, wherein said third mechanism comprises:
    a frame;
    a support member pivotably mounted on said frame, said carrier being pivotably mounted on said support member; and
    an actuator for pivoting said support member to move said carrier toward the platen.

11. Apparatus according to claim 10, further comprising means, supported by said frame, for illuminating a contact print slide engaged with said carrier.

12. Apparatus according to claim 10, wherein said support member comprises a yoke having spaced arms pivotably mounted on said frame; and said carrier is pivotably mounted between said arms.

13. Apparatus according to claim 10, wherein said carrier comprises a pair of parallel grooves for receiving opposite edges of a contact print slide.

14. Apparatus according to claim 1, wherein said first mechanism moves a contact print slide to said first position along a path transverse to a direction of movement of a photographic paper along the platen; and said second mechanism moves said carrier parallel to said direction of movement; and wherein said first mechanism comprises:
    a slider;
    a support frame mounted on said slider for receiving a contact print slide;
    a rail supporting said slider for movement to said first position; and
    a driver to move said slider along said rail.

15. Apparatus according to claim 14, further comprising a selectively actuateable clamp supported by said slider for holding a contact print slide on said support frame until engagement with said carrier.

16. Apparatus according to claim 15, wherein said support frame comprises a pair of spaced members for engaging opposite sides of a contact print slide and a recessed base between said members; and said clamp comprises a pivotable member mounted to said slider, said pivotable member having at least one clamping finger for pressing a contact print slide against said support frame, a spring biasing said clamping finger to contact a contact print slide; and an actuator mechanism for selectively pivoting said pivotable member against a bias of said spring to disengage said clamping finger from a contact print slide.

17. Apparatus according to claim 14, wherein said support frame and said rail are on opposite sides of the platen; and said slider includes an opening for receiving an edge of the platen as said slider moves along said rail to said first position.

18. Apparatus according to claim 14, wherein said second mechanism comprises:
    a frame supporting said carrier; and
    at least one guide rail supporting said frame for movement to said first position; and
    a driver to move said frame along said guide rail.

19. In a photographic printer of a type having a platen for supporting a photographic paper during exposure of an image onto the paper at a paper print gate at the platen, an improvement comprising:
    a carrier for holding a contact print slide;
    a first mechanism for receiving a contact print slide and for moving a contact print slide into a first position for engagement with and removal by said carrier;
    a second mechanism for moving said carrier toward said first position to engage said carrier with a contact print slide received by said first mechanism and for moving said carrier away from said first position to remove a contact print slide from said first mechanism; and
    a third mechanism for moving said carrier toward a photographic paper supported by said platen, thereby to place a contact print slide engaged with said carrier into contact with a photographic paper supported by said platen at said paper print gate.

20. Apparatus according to claim 19, wherein said first mechanism moves a contact print slide to said first position along a path transverse to a direction of movement of a photographic paper along said platen; and said second mechanism moves said carrier parallel to said direction of movement.

21. Apparatus according to claim 19, further comprising means for illuminating a contact print slide engaged with said carrier.

22. Apparatus according to claim 19, wherein said carrier comprises a pair of parallel grooves for receiving opposite edges of a contact print slide.

23. Apparatus according to claim 19, wherein said first mechanism comprises:
    a slider;
    a support frame mounted on said slider for receiving a contact print slide;
    a rail supporting said slider for movement to said first position; and
    a driver to move said slider along said rail.

24. Apparatus according to claim 23, further comprising a selectively actuateable clamp supported by said slider for holding a contact print slide on said support frame until engagement with said carrier.

25. Apparatus according to claim 24, wherein said support frame comprises a pair of spaced members for engaging opposite sides of a contact print slide and a recessed base between said spaced members; and said clamp comprises a pivotable member mounted to said slider, said pivotable member having at least one clamping finger for pressing a contact print slide against said support frame, a spring biasing said clamping finger to contact a contact print slide; and an actuator mechanism for selectively pivoting said pivotable member against a bias of said spring to disengage said clamping finger from a contact print slide.

26. Apparatus according to claim 23, wherein said support frame and said rail are on opposite sides of said platen; and said slider includes an opening for receiving an edge of said platen as said slider moves along said rail to said first position.

27. Apparatus according to claim 19, wherein said second mechanism comprises:

a frame supporting said carrier; and at least one guide rail supporting said frame for movement to said first position; and a driver to move said frame along said guide rail.

28. Apparatus according to claim 19, wherein said third mechanism comprises:

a frame;

a support member pivotably mounted on said frame, said carrier being pivotably mounted on said support member; and an actuator for pivoting said support member to move said carrier toward said platen.

29. Apparatus according to claim 28, further comprising means, supported by said frame, for illuminating a contact print slide engaged with said carrier.

30. Apparatus according to claim 28, wherein said support member comprises a yoke having spaced arms pivotably mounted on said frame; and said carrier is pivotably mounted between said arms.

31. Apparatus according to claim 28, wherein said carrier comprises a pair of parallel grooves for receiving opposite edges of a contact print slide.

32. Apparatus according to claim 19, wherein said first mechanism moves a contact print slide to said first position along a path transverse to a direction of movement of a photographic paper along said platen; and said second mechanism moves said carrier parallel to said direction of movement; and wherein said first mechanism comprises:

a slider;

a support frame mounted on said slider for receiving a contact print slide;

a rail supporting said slider for movement to said first position; and a driver to move said slider along said rail.

33. Apparatus according to claim 32, further comprising a selectively actuateable clamp supported by said slider for holding a contact print slide on said support frame until engagement with said carrier.

34. Apparatus according to claim 33, wherein said support frame comprises a pair of spaced members for engaging opposite sides of a contact print slide and a recessed base between said members; and said clamp comprises a pivotable member mounted to said slider, said pivotable member having at least one clamping finger for pressing a contact print slide against said support frame, a spring biasing said clamping finger to contact a contact print slide; and an actuator mechanism for selectively pivoting said pivotable member against a bias of said spring to disengage said clamping finger from a contact print slide.

35. Apparatus according to claim 32, wherein said support frame and said rail are on opposite sides of said platen; and said slider includes an opening for receiving an edge of said platen as said slider moves along said rail to said first position.

36. Apparatus according to claim 32, wherein said second mechanism comprises:

a frame supporting said carrier; and at least one guide rail supporting said frame for movement to said first position; and a driver to move said frame along said guide rail.

* * * * *